May 6, 1958
E. O. ROOF
2,833,102
VARIABLE PITCH MOWER
Filed Sept. 11, 1956
2 Sheets-Sheet 2
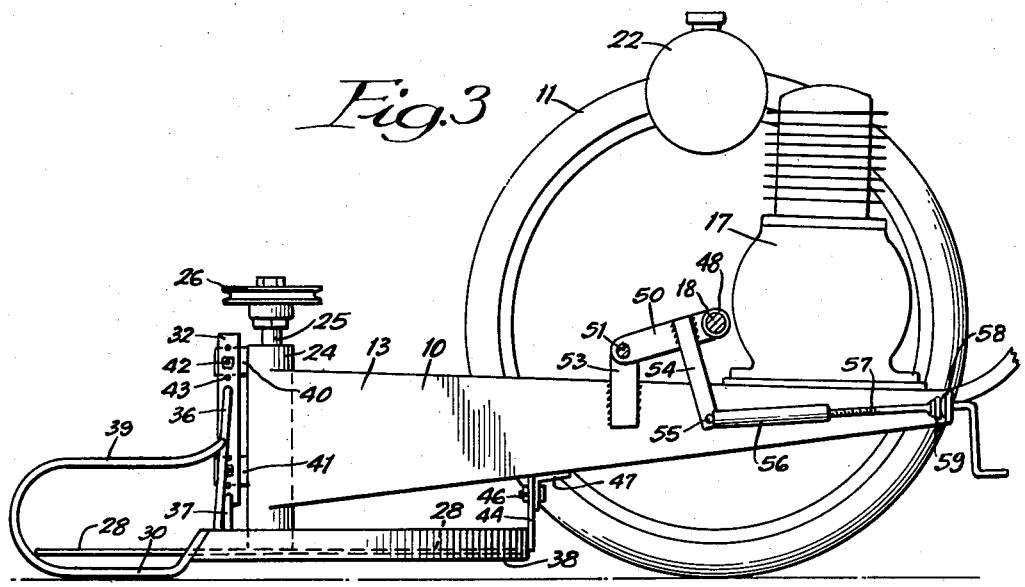
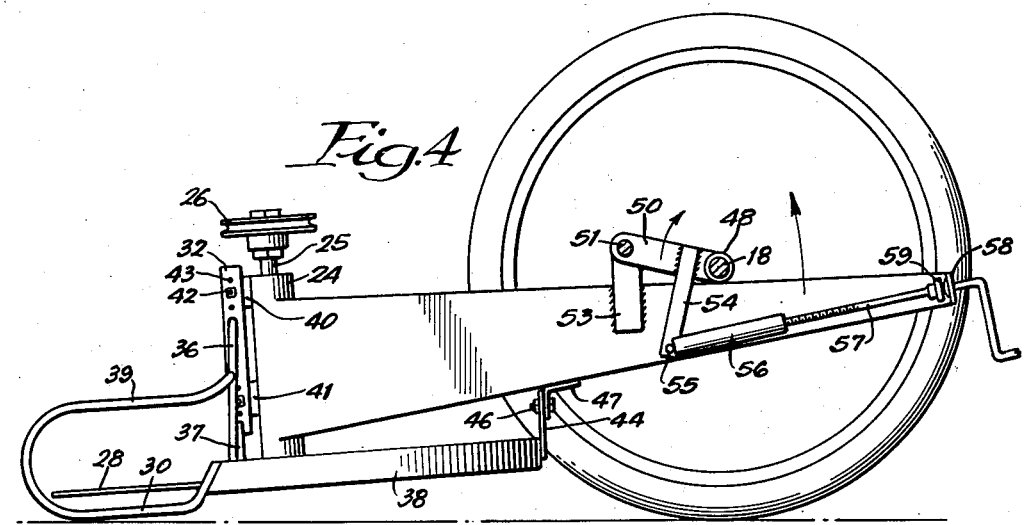
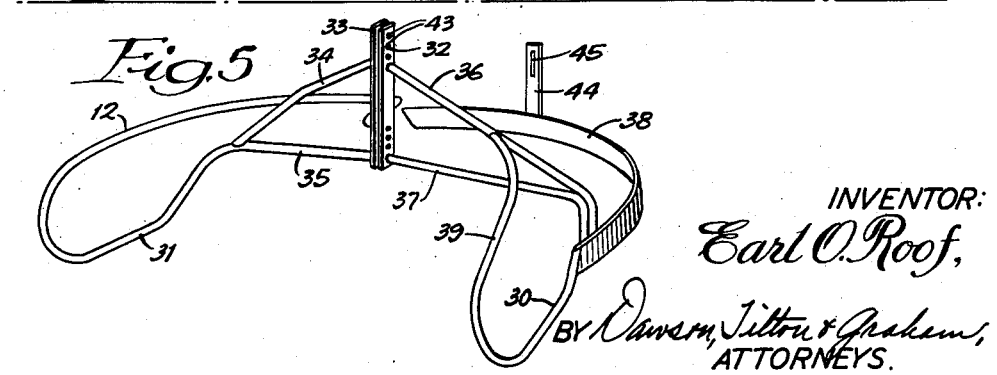
INVENTOR:
Earl O. Roof,
BY Dawson, Tilton & Graham,
ATTORNEYS.

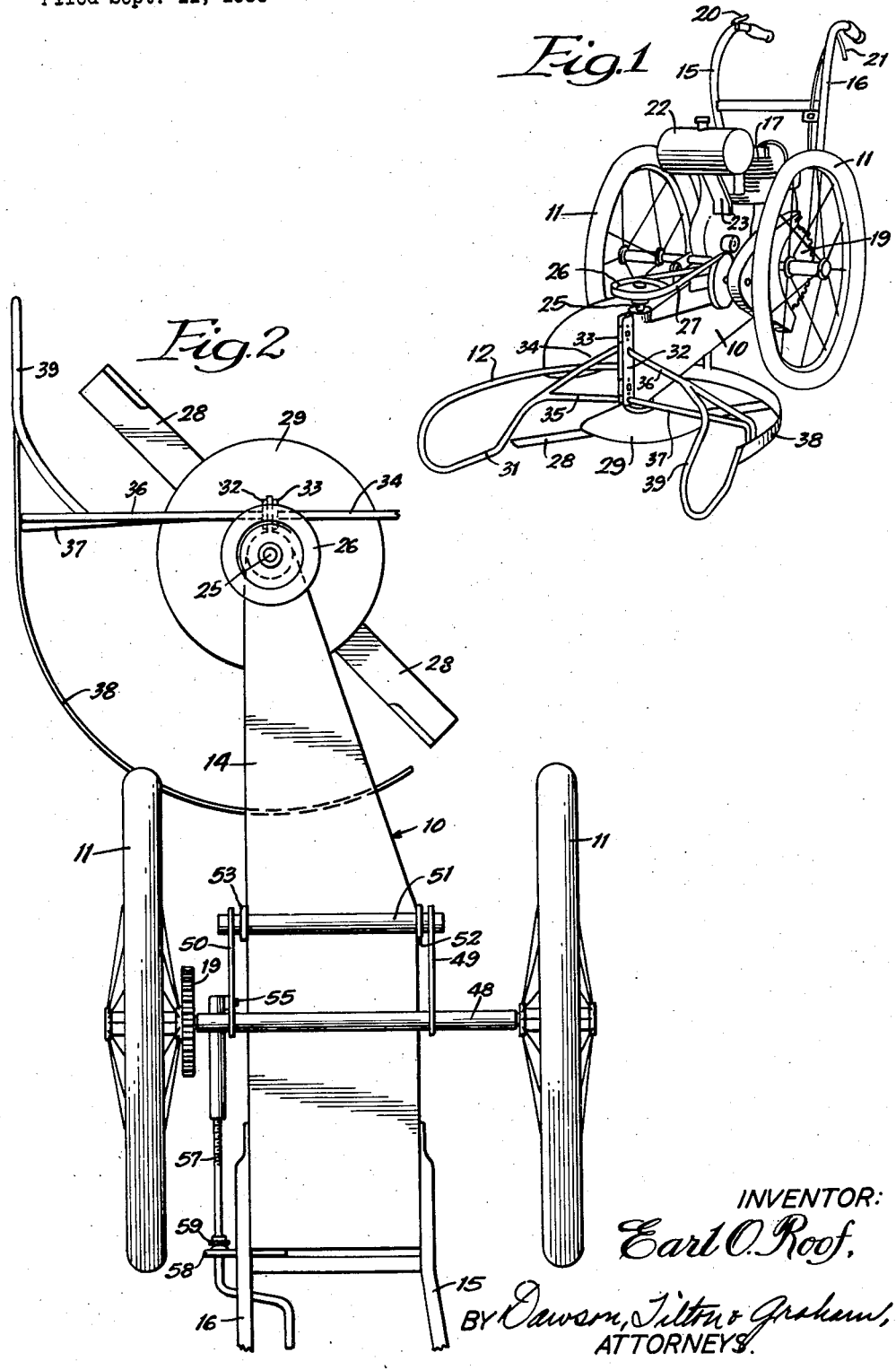

United States Patent Office 2,833,102
Patented May 6, 1958

2,833,102

VARIABLE PITCH MOWER

Earl O. Roof, Pontiac, Ill.

Application September 11, 1956, Serial No. 609,257

1 Claim. (Cl. 56—25.4)

This invention relates to a mowing machine and, more specifically, to a rotary blade mower in which the angle and the elevation of the cutter blade are independently adjustable.

Rotary blade mowers—that is, mowers in which the cutting blades rotate in a generally horizontal plane—have become increasingly popular in recent years, partly because of their effectiveness in cutting a wide variety of weeds and grasses and partly because of their ability to trim close to fences and other obstacles without danger that the blades will strike these obstructions. In some of these machines means are provided for changing the pitch or angle of the cutting blade so that the blade may be tilted downwardly and forwardly for cutting brush matter or weeds most effectively, or alternatively, may be maintained in a plane substantially parallel with the ground for cutting lawn grasses.

One disadvantage of the present rotary mowers lies in the fact that angle adjustment of the cutters is generally limited to a relatively small number of predetermined blade settings. As a result it is often difficult, if not impossible, to set the blade at the most suitable angle for cutting particular types of grasses or weeds. Furthermore, in order to adjust blade pitch, an operator must usually stop cutting operations, shut off the motor, and reset the blade angle from the front of the mower. It is believed evident, therefore, that an operator is caused considerable inconvenience and difficulty were frequent adjustments of blade angle are necessary in order to obtain satisfactory cutting results.

Therefore one of the main objects of the present invention is to provide an improved rotary mower wherein the rotary cutter blade may be easily and quickly set at any of an indefinite number of angular positions, ranging between a lowered horizontal position and a raised position of maximum inclination. In this connection it is a specific object to provide a variable pitch mower in which the blade angle may be altered without changing the elevation of the cutting arc of that blade. Alternatively, it is an object to provide a mower in which the elevation of the cutting arc of the blade can be varied without changing its pitch. Another object is to provide an improved rotary power mower having means for safely and easily varying the angle of the cutter blade while the power mower is in operation. A still further object of the present invention is to provide a rotary mower wherein the blade angle may be adjusted by an operator at the handle end of the mower so that the operator may easily and quickly vary the pitch of the blade without moving from his position behind the machine.

Other objects will appear from the specification and drawings in which:

Figure 1 is a perspective view showing a rotary power mower embodying the present invention; Fig. 2 is an enlarged broken top plan view of the mower with the power unit and propelling mechanism removed therefrom; Fig. 3 is a vertical sectional side view illustrating the variable pitch mower with the blade in horizontal position; Fig. 4 is a vertical side section similar to Fig. 3 but showing the blade in an inclined position; and Fig. 5 is a perspective view illustrating details of the guard and skid structure.

Referring to the drawings, Fig. 1 shows a rotary power mower embodying the present invention and having a frame 10, drive wheels 11, and guard and skid assembly 12. The frame may be formed from sheet metal and, as illustrated most clearly in Figs. 2 and 3, is provided with rearwardly tapered side panels 13 and a top panel 14 having a forwardly tapered front portion. A pair of handles 15 and 16 may be welded or otherwise secured to the rear end of frame 10 for manually guiding the power mower. The power unit comprises a gasoline engine 17 which is mounted upon the frame slightly behind and above the axle 18 of the drive wheels and which is operably connected to axle gear 19 through a suitable gear and clutch assembly. Near the grip of handle 15 is a throttle control lever 20 for regulating the speed of the motor and handle 16 is equipped with a clutch control lever 21 for engaging and disengaging the drive wheels. The motor is equipped with the usual fuel tank 22 which is connected to the motor housing by bracket 23. Since the above described structure is entirely conventional, further detailed description is believed unnecessary herein.

At the front end of the frame is a journal housing 24 which rotatably carries a generally vertical shaft 25. The upper end of the shaft is provided with a grooved pulley 26 and a drive belt 27 extends from the motor and is entrained about this pulley to rotate the cutter shaft. A two-bladed cutter bar 28 is mounted at the lower end of the shaft below frame 10 and rotates in a generally horizontal plane as shaft 25 is driven by the motor. Preferably a frusto conical disc 29 is fixed to journal housing 24 directly above cutter 28 to prevent weeds and long grasses from wrapping around the lower end of the journal housing and the portion of the cutter bar adjacent the housing during operation of the mower.

In the illustration given, the front support assembly comprises a pair of skid structures 30 and 31, (Figure 5). Each of the skids has a centrally disposed and vertically extending plate 32 and 33 respectively from which a pair of converging bars project laterally therefrom. The lateral bars 34 and 35 of skid structure 31 converge at a point above and beyond the arc described by the tip of the cutter blade, and bar 35 then turns downwardly, forwardly, upwardly and rearwardly to define a loop which lies along a generally vertical plane. Similarly the bars 36 and 37 of the other skid structure converge at a point beyond the arc of the cutter blade. An arcuate rear shield 38 is welded or otherwise secured to the outer portions of bars 36 and 37 and curves rearwardly and inwardly slightly beyond the arc defined by the tip of the blade as it passes behind the lateral bars. A vertical loop corresponding with the loop provided by the opposing support skid is defined by a bar 39 which may be formed integrally with either of the lateral bars or which may be welded to those bars as shown in the drawings. It will be noted that the vertical loops of the support frame have parallel lower portions lying below the plane of blade rotation and curving upwardly on each side of the most forward portion of the blade's arc for slidably supporting the front end of the mower upon the ground. Since the front end of the blade and the point at which the lower portion of each skid loop starts its upward curvature lie along the same vertical and transversely extending plane, the elevation of the blade's front portion will remain substantially the same despite variations in the angle or pitch of the blade with reference to the ground.

At the front of journal housing 24 are a pair of forwardly extending ears 40 and 41 for attaching the skid structures to mower frame 10. Each of the ears is provided with a transverse opening adapted to receive bolt connectors 42. As illustrated most clearly in Figs. 3–5, each of the vertical plates 32 and 33 of the skid structures is equipped with vertical groups of transverse openings 43, corresponding openings of each group being alignable with the openings in ears 40 and 41 for setting the skids at different selected vertical positions with reference to the frame 10. In the illustration given, bolts 42 may extend through either the upper, the intermediate, or the lower openings of each group of openings in the opposing plates 32 and 33 to clamp the plates at different vertical positions on opposite sides of the ears. While three openings are shown in each of the groups, it will be understood that a larger number may be provided if desired to increase the number of vertical positions of the cutter blade. It will also be noted that for certain cutting operations, such as the cutting of brush or long grasses, skid structure 31 may be omitted and structure 30 may be independently mounted upon the mower frame in any of the selected positions described above. To provide additional support for the skid assembly, shield 38 may be equipped with an upstanding arm 44 having a vertical slot 45 therein. Bolt 46 extends through this slot and connects the arm to a bracket 47 mouted beneath the frame 10. Vertical adjustability of the shield is obtained by loosening the bolt and sliding the slotted arm into a position corresponding with the placement of bolts 42.

Since the cutter, skid assembly and the bulk of frame 10 are disposed in front of axle 18, it is evident that skids 30 and 31 support a substantial portion of the mower's weight. The placement of motor 17 directly behind the axle tends to reduce the proportion carried by the skids but does not completely offset the weight of the structure disposed in front of the axle. Hence the axle extends across the frame behind the center of gravity of the mower; the weight of the mower being distributed between the wheels and the front skids or runners. Since the front skids ride upon the ground during a cutting operation, the angle of the cutter blade may be varied by changing the distance between axle 18 and the frame, thereby rocking or pivoting the frame upon the front lower portions of the skid loops.

As shown in Figures 2, 3 and 4, axle 18 is rotatably carried within a tubular sleeve 48, which is welded or otherwise secured to the rear ends of a pair of parallel arms 49 and 50. These arms extend along opposite sides of the frame 10 and have their opposite or front end portions secured to the ends of a transverse shaft 51. The shaft in turn is rotatably supported above the frame by upstanding arms 52 and 53 which are preferably welded upon opposite sides of frame 10.

Since arms 49 and 50 are parallel and are fixed to shaft 51, the arms and shaft may be pivoted as a unit about the longitudinal axis of the shaft. In Figs. 2 and 3 it will be seen that a depending lever 54 has its upper end fixedly secured to arm 50 and has its lower end pivotally connected by pin 55 to the front end of a rearwardly extending tube 56. This tube is internally threaded to receive the threaded shaft portion of pitch adjusting crank 57. The shaft of the crank passes freely through the opening of a bracket 58 which is fixed to the rear end of frame 10 and is provided with an enlargement 59 which bears against the curved bearing surface of the bracket to prevent rearward longitudinal movement of the shaft.

Since the wheels of the mower are secured to axle 18, it is apparent that the weight of the frame and motor assembly behind and adjacent the axle tends to urge the rear portion of the frame downwardly away from the axle. In consequence arms or links 49 and 50 tend to pivot downwardly about the axis of the axle and the free end of lever 54 is urged rearwardly towards the rear end of the frame. Such rearward movement of the lever is limited and controlled by the crank assembly comprising the threaded tubular sleeve 56 and cranking shaft 57.

While tubular sleeve 56 is free to pivot upwardly and downwardly about the pin 55, rotation of this sleeve is prevented by its forward mounting. Therefore, as crank 57 is rotated, the distance between the free end of the lever and the rear end of the frame increases or decreases, depending upon the direction of crank rotation. In the illustration given, rotation of the crank in a counter-clockwise rotation causes the threaded portion of the pitch adjusting crank to screw out of the internally threaded bore of the sleeve 56, thereby increasing the distance between the lower end of the lever and the rear end of the frame and pivoting linking arms 49 and 50 upwardly about the axis of the axle 18. As the front end of the links swing upwardly, shaft 51, arms 52 and 53, and frame 10 move upwardly to pivot the frame about the ground-contacting portions of the forward skid assembly (Fig. 4). Conversely, to pivot the frame downwardly from a raised inclined position to a lowered position parallel with the ground, crank 57 is turned in a clockwise direction to decrease the distance between the fixed point provided by end bracket 58 and the free end of depending lever 54 (Fig. 3).

In the operation of the mower, lawns and short grasses are cut most effectively when shaft 25 is normal to the ground surface; that is, when cutter blade 28 rotates in a generally horizontal plane. Movement of the blade parallel with the ground insures even and smooth cutting of the lawn grasses. However, for cutting taller grasses and weeds, it is desirable to tip the rotating shaft so that its axis is inclined forwardly from zero to 10° in the direction of normal movement of the machine. The cutting blade will therefore revolve in a plane forming an angle with the ground, the blade as it rotates being closer to the ground in front of the shaft than behind that shaft. Since the blade, as it covers the rear portion of its ctuting arc, will have clearance from cut stubble, drag or friction is reduced and a greater proportion of the power supplied by the driving means is applied to the cutting of brush, weeds or tall grasses along the front portion of the cutting arc. Furthermore, when the cutting blade is in a forwardly inclined position, the cut portions of tall weeds and other tall material are less likely to become wrapped about the cutter blade adjacent the shaft upon which the blade is mounted and if the cut material is caught by the blade, it is quickly released therefrom as the blade swings upwardly through the rear portion of its cutting circle. It will also be noted that weeds or long grasses which have been trampled or which grow close to the ground are cut more effectively when the plane of blade rotation is angled with reference to the ground and in the direction of normal movement of the machine.

When adjustment of the blade angle is desired, an operator simply rotates the handle portion of the crank to pivot the frame of the mower about the points at which the skid assembly rests upon the ground. Since the handle portion of the crank is disposed behind wheels 11, it is within easy reach of an operator standing behind the machine. Hence, the angle of the rotary cutter blade may be varied while the blade is rotating without endangering the operator, the operator remaining in his normal position behind the mower while making such adjustment.

An important feature of the present invention lies in the fact that the front cutting arc of the blade remains at substantially the same elevation, despite variations in blade angle or inclination. The height of the blade from the ground is varied by resetting the clamping plates 32 and 33 at different selected positions with reference to the front of the mower frame. Therefore, the means for adjusting the cutter blade elevation is substantially independent from the means for varying the inclination of that blade. Thus, when it is desired to vary the height of the cut, this can be done without changing the pitch and vice versa.

While in the foregoing I have set forth an embodiment of the present invention in considerable detail for purposes of illustration, it will be understood by those skilled in the art that many of these details may be varied without departing from the spirit and the scope of the invention.

I claim:

A self-propelled, variable pitch, weed cutter and lawn mower, comprising a generally horizontally-extending frame, a cutter blade suspended below the forward portion of said frame for rotation in a generally horizontal plane, ground-engaging support means connected to the forward portion of said frame and extending for an adjustably variable distance below the rotational plane of said cutter blade, a continuous axle extending transversely across the rearward portion of said frame and projecting outwardly on each side thereof, a wheel mounted on each of the projecting ends of said axle for rotation therewith and extending downwardly below said frame, an engine carried by said frame, power transfer means connecting said engine with said axle for driving said wheels through said axle, power transfer means also connecting said engine with said cutter blade, linking means for pivotally linking said axle to the rearward portion of said frame, cranking means carried by the rearward portion of said frame and cooperating with said linking means to pivot the same for raising and lowering the rearward portion of said frame with reference to said axle and thereby varying the rotational pitch of said cutter blade, and guide handle means extending rearwardly from the rearward portion of said frame, said cranking means including a crank handle adapted for manual actuation and positioned at the rear of said frame adjacent said guide handle means, whereby the operator of said mower can adjust the rotational pitch of said cutter blade at any preselected height without discontinuing the operation of said mower.

References Cited in the file of this patent
UNITED STATES PATENTS

| | | |
|---|---|---|
| 2,263,368 | Sejkora | Nov. 18, 1941 |
| 2,329,185 | Coddington | Sept. 14, 1943 |
| 2,504,259 | Ford | Apr. 18, 1950 |
| 2,521,972 | Haglund et al. | Sept. 12, 1950 |
| 2,529,328 | Carter | Nov. 7, 1950 |
| 2,552,951 | Freeman | May 15, 1951 |
| 2,556,446 | Roach | June 12, 1951 |
| 2,564,201 | Hainke | Aug. 14, 1951 |
| 2,568,822 | Pervis | Sept. 25, 1951 |
| 2,569,682 | Lewis | Oct. 2, 1951 |
| 2,671,299 | Orr | Mar. 9, 1954 |